Patented Nov. 21, 1950

2,530,451

UNITED STATES PATENT OFFICE 2,530,451

PHENOTHIAZINES

Paul Charpentier, Choisy-le-Roi, France, assignor to Societe des Usines Chimiques Rhone-Poulenc, Paris, France, a corporation of France No Drawing. Application November 28, 1947, Serial No. 788,649. In France January 24, 1946

Section 1, Public Law 690, August 8, 1946
Patent expires January 24, 1966

5 Claims. (Cl. 260—243)

This invention relates to new and useful phenothiazine compounds and processes of producing such compounds and is a continuation-in-part of application Serial No. 650,747, filed February 27, 1946.

As a result of protracted research and experimentation it has been discovered that phenothiazine compounds which have a dialkylamino alkyl substituent on the ring nitrogen atom have a marked anti-dyspnoeic and anti-histaminic activity and therefore an important therapeutic value.

One class of such derivatives conform to the general formula:

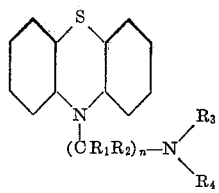

in which $R_1$ and $R_2$ are members of the class consisting of hydrogen atoms and alkyl groups (for example, methyl, ethyl and propyl), $R_3$ and $R_4$ represent alkyl groups (for example, methyl, ethyl, propyl, butyl) and $n$ represents an integer greater than 1 ($n$ may conveniently represent, for example, 2, 3, 4 or 5). The benzene nuclei may be substituted by alkyl or alkoxy groups.

According to the present invention phenothiazine compounds of especially valuable therapeutic properties, and in particular anti-histaminic activity, conform to the formula:

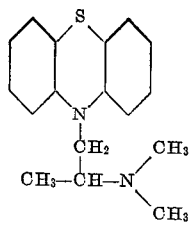

The benzene nuclei may contain alkyl or alkoxy substituent groups.

These new phenothiazine derivatives may be prepared by the action of a 1-halo-2-dimethylamino-propane e. g. 1-chloro-2-dimethylaminopropane on phenothiazine itself or on a corresponding compound containing an alkyl or alkoxy substituent in the benzene ring, in the presence of a halogen-acid-binding agent, preferably sodamide.

Alternatively the new phenothiazine derivatives may be prepared by the action of a 1-dimethylamino-2-halo-alkane e. g. 1-dimethylamino-2-chloro-propane on phenothiazine itself or on a corresponding compound containing an alkyl or alkoxy substituent in the benzene ring, in the presence of a halogen-acid-binding agent, preferably sodamide. It will be appreciated that in this latter reaction isomerisation occurs so that the dialkylamino group is present in the final product on a carbon atom in β-position to the ring nitrogen atom.

Preferably the reaction is effected at elevated temperature and in the presence of an organic diluent.

The following examples will serve to illustrate the invention but are not to be regarded as limiting it in any way:

Example I 30 g. of phenothiazine, 120 g. of xylene, and 7 g. of sodamide (85%) are mixed and heated under reflux. A solution of 23 g. of the base obtained by the action of sodium hydroxide on the hydrochloride of 1-dimethylamino-2-chloropropane, in 25 g. of xylene, is then added little by little during one hour, while maintaining the temperature of the reaction mixture; heating under reflux is then continued for a further hour. After cooling, the mixture is taken up in 400 cc. of water and rendered slightly acid with hydrochloric acid. The xylene is decanted, the aqueous layer is rendered strongly alkaline with caustic soda and the base which separates is extracted with ether. The ethereal extract is rectified, the fraction which boils at 190–192° C. under 3 mm. being recovered. This is diluted with acetone or ethyl acetate and dry hydrochloric acid is added. The hydrochloride of N-(2'-dimethylamino-2'-methyl-ethyl)-phenothiazine, melting point 203–204° C., separates. On addition of caustic soda the free base is liberated. Its picrate has melting point 164° C., and its methyl benzene sulphonate has melting point 275° C.

Example II 30 g. of phenothiazine, 120 g. of xylene and 7 g. of sodamide (85%) are mixed and boiled under reflux. A solution of 23 g. of the base obtained by the action of sodium hydroxide on the hydrochloride of 1-chloro-2-dimethyl-amino-propane, in 25 g. of xylene, is then added little by little over a period of one hour, after which the mixture is again boiled for one hour under reflux. After cooling, 400 cc. of water are added and the solution made acid with hydrochloric acid. The aqueous layer is separated and made alkaline by an excess of caustic soda. The desired base separates and is shaken with ether. The ethereal solution is rectified, the fraction which distils at 190–192° C. at 3 mm. pressure being collected. This is treated as for the product of Example I.

The identity of the products of these two examples is clearly established by the identity of the melting points of the corresponding derivatives, which do not show any lowering of the melting point on mixing.

All the melting points are taken on the Maquenne block (instantaneous M. P.).

I claim:

1. The new compounds of the class consisting of N-(2'-dimethylamino-2'-methylethyl) phenothiazine of the formula:

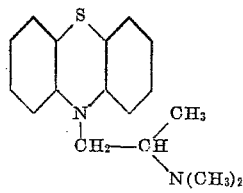

and its salts.

2. Process for the preparation of N-(2'-dimethylamino-2'-methylethyl) phenothiazine which comprises heating phenothiazine, in the presence of sodamide, with a halo-dimethylamino propane in which the halogen atom and the dimethylamino grouping are substituted on adjacent carbon atoms of the propane chain, and separating from the reaction mixture the N-(2'-dimethylamino-2'-methylethyl) phenothiazine produced.

3. Process for the preparation of N-(2'-dimethylamino-2'-methylethyl) phenothiazine which comprises heating phenothiazine, in the presence of sodamide, with 1-chloro-2-dimethylamino propane, and separating from the reaction mixture the N-(2'-dimethylamino-2'-methylethyl) phenothiazine produced.

4. Process for the preparation of N-(2'-dimethylamino-2'-methylethyl) phenothiazine which comprises heating phenothiazine, in the presence of sodamide, with 1-dimethylamino-2-chloropropane, and separating from the reaction mixture the N-(2'-dimethylamino-2'-methylethyl) phenothiazine produced.

5. Process for the preparation of N-(2'-dialkylamino-2'-methylethyl)-phenothiazine which comprises reacting phenothiazine with a 1-dialkylamino-2-halopropane in the presence of sodamide.

PAUL CHARPENTIER.

REFERENCES CITED

The following references are of record in the file of this patent:

UNITED STATES PATENTS

| Number | Name | Date |
|---|---|---|
| 2,406,594 | Djerassi et al. | Aug. 27, 1946 |

OTHER REFERENCES

Gilman et al., Jour. Am. Chem. Soc., 66, 888–892 (1944).

Halpern et al., Comptes Rendus de la Societe de Biologie, 115, 361–365 (1946).

Wiselogel, Survey of Antimalarials, 1941–1945 (1946), vol. II, part 1, pp. 699–700 [Survey Nos. 625, 626, 627 and 629 (Oct. 29, 1942) and 1843 and 1844 (Mar. 9, 1943)].